Oct. 17, 1961   A. W. GERRANS   3,004,443
ADJUSTABLE TAKE-UP MECHANISM
Filed Jan. 11, 1960
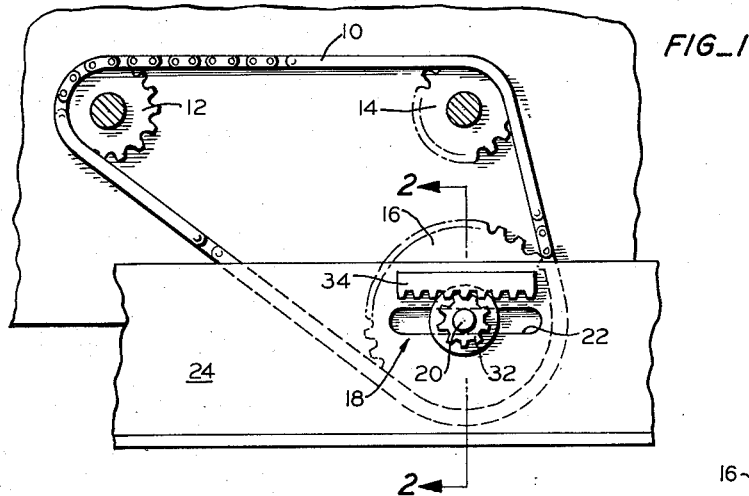
FIG_1
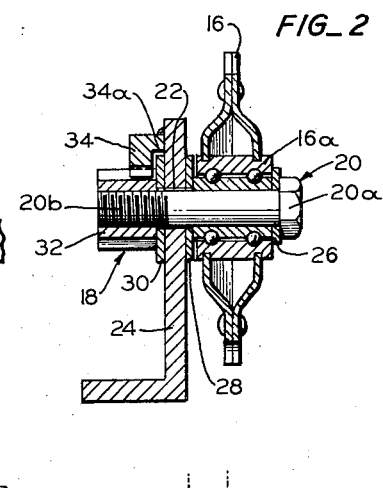
FIG_2
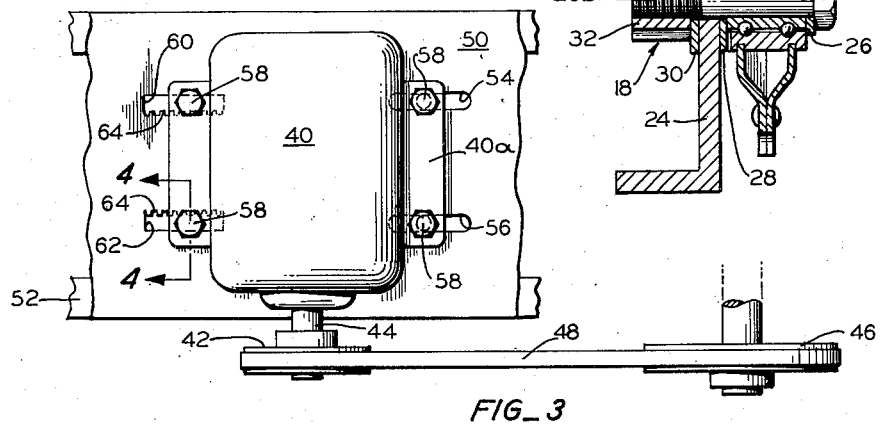
FIG_3
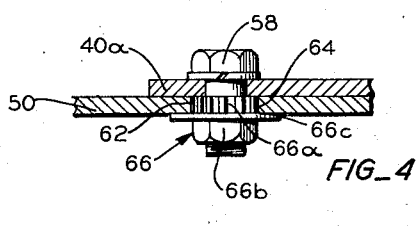
FIG_4
INVENTOR.
ALFRED W. GERRANS
BY
Paul B. Fike
PATENT AGENT

United States Patent Office

3,004,443
Patented Oct. 17, 1961

3,004,443
ADJUSTABLE TAKE-UP MECHANISM
Alfred W. Gerrans, 861 Curtner, San Jose, Calif.
Filed Jan. 11, 1960, Ser. No. 1,510
5 Claims. (Cl. 74—422)

The present invention relates generally to take-up mechanisms, and primarily, though not exclusively, to adjustable take-up mechanisms for tensioning sprocket chains, endless belts, and the like.

In mounting endless chains on sprockets or endless belts on a series of pulleys, at least one of the sprockets or pulleys must be shifted to allow the chain or pulley to be mounted and thereafter the sprocket or pulley shifted in the opposite direction until the required degree of chain or belt tension is achieved. While in principle such mounting of a sprocket chain or endless belt is simple, in practice difficulties are experienced particularly when long and heavy sprocket chains are to be mounted. Considerable force is then required to achieve the desired tension and frequently crow bars or other implements must be utilized as levers for this purpose. Furthermore, once the desired degree of tension is established, it is necessary to maintain such tension while bolting or other fastening of the sprocket in its proper position is completed. In most instances, at least two people are required for such a mounting or assembly in that one person must maintain the desired degree of tension with the crow bar or other implement while a second person secures the sprocket in its final adjusted position.

Accordingly, it is a general object of the present invention to provide a simple take-up mechanism which both enables the achievement of the desired degree of take-up or tension of the sprocket chain or belt and thereafter functions as the fastening or securing element for the adjusted sprocket while the tension is maintained.

It is a feature of the invention to provide a take-up mechanism which incorporates a considerable mechanical advantage or leverage so as to facilitate achievement of the desired degree of tension for even long and heavy sprocket chains.

Additionally, it is a feature of the invention to provide a take-up mechanism of extremely simple form wherefore it is inexpensive and is applicable to substantially all installations where take-up of a sprocket chain, belt or other element is required.

It is another feature of the invention to provide a take-up mechanism which when secured in its final adjusted position effectively precludes accidental slipping and lessening of tension over extended periods of chain or belt operation.

These as well as other objects and features of the invention will become more apparent from a perusal of the following description of the accompanying drawing wherein:

FIG. 1 is a fragmentary side elevational view of a sprocket chain assembly incorporating a take-up mechanism embodying the present invention, FIG. 2 is a fragmentary sectional view taken along line 2—2 of FIG. 1, FIG. 3 is a top plan view of a motor and belt assembly incorporating a take-up mechanism which constitutes a modified embodiment of the present invention, and FIG. 4 is a transverse sectional view taken along line 4—4 of FIG. 3.

With initial reference to FIG. 1, an endless sprocket chain 10 of a conventional type is trained about three spaced sprockets 12, 14, 16, two of which are mounted for rotation in fixed positions while the third is mounted for rotation about an axis which is rendered adjustable by a take-up mechanism generally indicated at 18 and constituting a preferred embodiment of the present invention.

With additional reference to FIG. 2, the third sprocket 16 is of the unitary type having a self-contained bearing 16a and the entire sprocket unit is mounted on a conventional bolt 20 which projects through a longitudinal slot 22 in a mounting plate 24 which forms one part of the stationary frame of the machine or apparatus on which the entire sprocket assembly is mounted. The head portion 20a of the bolt 20 lies on the side of the sprocket 16 remote from the mounting plate 24, a conventional washer 26 being interposed between the bolt head 20a and the sprocket 16. Additional washers 28, 30 on the shank 20b of the bolt engage opposite sides of the mounting plate 24 and a nut 32 is screwed on the threaded end of the bolt 20 to complete the assembly.

In accordance with the present invention, the nut 32 is externally formed to provide the teeth of a pinion gear and a rack 34 is mounted on the side of the mounting plate 24 so that its teeth are arranged to engage the teeth of the described pinion nut 32. More particularly, such rack 34 is generally L-shaped in cross-section with one end of the L welded or otherwise secured to the side of the mounting plate 24 and the remote end of the L formed with the mentioned teeth. Due to the described shape and mounting of the rack 34, a longitudinal recess 34a is formed between the teeth of the rack 34 and the side of the mounting plate 24 and such recess is sufficient in its dimensions to accommodate the adjacent washer 30. As clearly illustrated in FIG. 2, the teeth of the pinion nut 32 are wider than those of the rack 34 so that the pinion teeth project beyond the outer face of the rack and thus enable engagement with an appropriate form of wrench. Preferably, the teeth on the pinon nut 32 are arranged to receive a conventional or standard wrench. When such a wrench engages the nut 32 and torque is applied, the pinion nut 32 moves along the rack 34 carrying the bolt 20 and the sprocket 16 therewith, such movement constituting the desired take-up action.

In order to assemble the described take-up mechanism 18 to an existing machine, it is, of course, first necessary to cut the longitudinal slot 22 in the mounting plate 24 or frame member at the desired location, and weld a rack 34, as described, thereon adjacent such slot. The rack 34 and pinion nut 32 can readily be manufactured in the described forms by known manufacturing processes and with teeth of appropriate number and shape so that the nut 32 will receive a standard wrench. To complete an assembly with the desired take-up, the nut 32 is initially loosely applied to the end of the bolt 20 and after adjustment has been made, by turning the nut, the bolt is turned to secure the assembly in the desired adjusted relationship.

More particularly with reference to FIG. 1, the adjustably mounted sprocket 16 is initially placed in a position to the left of that illustrated in order that the sprocket chain 10 can be passed around its circumference. The wrench is then applied to the projecting end of the pinion nut 32 to turn the same in a counterclockwise direction so that the entire sprocket assembly is then moved to the right until the desired degree of chain tension is achieved. While maintaining such position with continued application of torque to the pinion nut 32, another wrench is applied to the head 20a at the remote end of the bolt 20 to tighten the same and thus secure the assembly in its adjusted position.

It should be noted that the tension of the sprocket chain 10 will urge the sprocket assembly to the left as viewed in FIG. 1, but any force in this direction will tend to rotate the pinion nut 32 only in a clockwise direction so as to further tighten the nut on the bolt 34, the nut being applied with a conventional right hand thread, as seen in FIG. 2. Thus, slippage of the mounting and lessening of chain tension is substantially precluded even for periods of extended operation.

Obvious alterations of the described structure and its application are possible, one such alteration being shown by way of example in the modified embodiment of the invention illustrated in FIGS. 3 and 4 to which reference is now made. Initially with reference to FIG. 3, a motor 40 having a pulley 42 mounted on its shaft 44 is arranged to drive another pulley 46 by means of an endless belt 48 in a conventional fashion. In order to provide for take-up of such belt 48, the base 40a of the motor 40 rests on a plate 50 that is slotted at its four corners in substantial parallelism to the longitudinal direction of the mentioned belt 48 to enable adjustment of the motor thereon relative to a stationary frame 52 of which such mounting plate 50 is a part. Two slots 54, 56 in the plate 50 are conventional and receive the motor mounting bolts 58 which project downwardly through apertures in the corners of the motor base 40a to receive conventional nuts (not shown). The other slots 60, 62 are each formed with a rack 64 whose teeth are adapted to engage the teeth of a pinion, forming a portion 66a of a nut, generally indicated at 66 and as illustrated in FIG. 4. Such nut 66 also includes a conventional hexagonal portion 66 for engagement by a crescent wrench or other implement, and an intermediate integral washer portion 66C adapted to engage the undersurface of the mounting plate 50.

In this embodiment of the invention, the nuts on all four bolts 58 are initially loosened and the belt 48 can then be slipped over the pulley 42 on the motor shaft 44 while the motor 40 and its base 40a are shifted slightly to the right of the position illustrated in FIG. 3. After the belt 48 is assembled over the drive pulley 42, the entire unit can then be moved to the left, as viewed in FIG. 3. Up to a certain point such shifting can be achieved merely by manual force exerted on the motor 40 itself, but beyond this disposition, a wrench can be applied to the hexagonal heads of the adjustment nuts 66 and the same turned in a clockwise direction, as viewed in FIG. 3 until the desired degree of tension of the belt 48 on the pulleys 42, 46 is achieved. The bolts 58 can then be tightened on the adjustment or take-up structure to maintain the degree of belt tension achieved and the other conventional nuts and bolts can then be also clamped into position to assure retention of the assembled relationship. Any error in the disposition of the motor shaft 44 can obviously be accommodated by relative adjustment of the two take-up mechanisms.

Obviously many further modifications and/or alterations can be made in the described structure without departing from the spirit of the invention. Accordingly, the foregoing description of two embodiments of the invention are to be considered as purely exemplary and not in a limiting sense and the actual scope of the invention is to be indicated by reference to the appended claims.

What is claimed is:

1. An adjustable take-up mechanism which comprises a rack, a pinion nut arranged for meshing engagement with said rack and for releasable clamped connection relative to said rack, and a bolt threaded to enter said pinion nut and arranged to effect clamping connection to releasably fix said pinion nut and rack in adjusted relative position, said pinion nut including an integral washer portion.

2. An adjustable take-up mechanism which comprises a rack, a pinion nut arranged for meshing engagement with said rack and for releasable clamped connection relative to said rack, and a bolt threaded to enter said pinion nut and arranged to effect clamping connection to releasably fix said pinion nut and rack in adjusted relative position, said pinion nut integrally including a pinion gear porton, a wrench-engaging portion and an intermedate washer portion.

3. An adjustable take-up mechanism which comprises a sloted mounting plate, a rack secured to one side of said plate in parallelism with said slot with a recess formed between the teeth of said rack and the side of said plate, a bolt projecting through said slot, a pinion nut threaded on said bolt and having teeth in meshing engagement with said rack, a washer projecting into said recess between said rack and the side of said mounting plate and adapted to establish clamping engagement with the side of said plate when said nut is tightened on said bolt.

4. An adjustable take-up mechanism according to claim 3 wherein said mounting plate has a second slot in spaced parallel relation to said first slot and which mechanism includes a second pinion nut, rack and bolt associated with said second slot.

5. An adjustable take-up mechanism which comprises a slotted mounting plate having a rack thereon, a pinion nut arranged for meshing engagement with said rack and capable of motion along its axis into clamping connection relative to said mounting plate, and a bolt threaded to enter said pinion nut and arranged to effect axial motion of said pinion nut into such clamping connection.

References Cited in the file of this patent
UNITED STATES PATENTS

| | | |
|---|---|---|
| 674,363 | Brady | May 21, 1901 |
| 1,319,122 | Shelton | Oct. 21, 1919 |
| 1,803,186 | Hendrickson | Apr. 28, 1931 |
| 1,869,888 | Dina | Aug. 2, 1932 |
| 2,035,096 | Schneider | Mar. 24, 1936 |
| 2,270,000 | Danker | Jan. 13, 1942 |
| 2,386,175 | Fisher | Oct. 9, 1945 |
| 2,747,464 | Bowerman | May 29, 1956 |